United States Patent
Kondrad et al.

(10) Patent No.: US 12,062,155 B2
(45) Date of Patent: Aug. 13, 2024

(54) DEVICE AND METHOD FOR ENHANCING IMAGES

(71) Applicant: Huawei Technologies Co., Ltd., Shenzhen (CN)

(72) Inventors: Lukasz Kondrad, Munich (DE); Atanas Boev, Munich (DE); Panji Setiawan, Munich (DE); Bogdan Cihodariu Ionita, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 282 days.

(21) Appl. No.: 17/491,007

(22) Filed: Sep. 30, 2021

(65) Prior Publication Data
US 2022/0020132 A1    Jan. 20, 2022

Related U.S. Application Data

(63) Continuation of application No. PCT/EP2019/059111, filed on Apr. 10, 2019.

(51) Int. Cl.
*G06T 5/50*        (2006.01)
*G02B 30/52*    (2020.01)
(Continued)

(52) U.S. Cl.
CPC .............. *G06T 5/50* (2013.01); *G02B 30/52* (2020.01); *G06T 5/20* (2013.01); *G06T 5/70* (2024.01);
(Continued)

(58) Field of Classification Search
None
See application file for complete search history.

(56) References Cited

U.S. PATENT DOCUMENTS

| | | | |
|---|---|---|---|
| 2011/0001790 A1* | 1/2011 | Marin | G06T 5/002 348/E13.001 |
| 2016/0147078 A1 | 5/2016 | Bedard et al. | |

FOREIGN PATENT DOCUMENTS

| | | |
|---|---|---|
| WO | 2017162594 A1 | 9/2017 |
| WO | 2019011447 A1 | 1/2019 |

OTHER PUBLICATIONS

Fisher et al., "Unsharp Filter," Spatial Filters, http://homepages.inf.ed.ac.uk/rbf/HIPR2/unsharp.htm#1, XP-002712725, Total 8 pages, HIPR2 (2003).

(Continued)

*Primary Examiner* — Peter Hoang
(74) *Attorney, Agent, or Firm* — Leydig, Voit & Mayer, Ltd.

(57) ABSTRACT

The present disclosure provides a an image processing device for providing a plurality of enhanced partial images which together represent an enhanced three-dimensional, 3D, image, wherein each enhanced partial image is a two-dimensional, 2D, image associated with one of a plurality of focal planes. The image processing device includes processing circuitry configured to receive or generate a plurality of initial partial images, which together form an initial 3D image, wherein each initial partial image is a 2D image associated with one of the plurality of focal planes; and to generate, from each of the initial partial images, an enhanced partial image by generating a blurred version of the initial partial image; and blending the initial partial image with the blurred version of the initial partial image.

18 Claims, 10 Drawing Sheets

(51) Int. Cl.
  G06T 5/20 (2006.01)
  G06T 5/70 (2024.01)
  G06T 5/77 (2024.01)
(52) U.S. Cl.
  CPC ...... *G06T 5/77* (2024.01); *G06T 2207/20221* (2013.01)

(56) References Cited

OTHER PUBLICATIONS

"DLP Technology for Near Eye Display," Literature No. DLPA051A, Total 18 pages, Texas Instruments Incorporated (Sep. 2014—Revised Aug. 2017).

Santi "Light Sheet Fluorescence Microscopy: A Review," Journal of Histochemistry and Cytochemistry 59(2), pp. 129-138, SAGE Publishing (2011).

Kramida "Resolving the Vergence-Accommodation Conflict in Head-Mounted Displays: A review of problem assessments, potential solutions, and evaluation methods," IEEE Transactions on Visualization and Computer Graphics, vol. 22, No. 7, Total 21 pages, Institute of Electrical and Electronics Engineers, New York, New York (Jul. 2016).

Lambooij et al., "Visual Discomfort and Visual Fatigue of Stereoscopic Displays: A Review," Journal of Imaging Science and Technology, vol. 53, No. 3, pp. 1-14, Society for Imaging Science and Technology (May-Jun. 2009).

Hu et al., "Design and Assessment of a Depth-Fused Multi-Focal-Plane Display Prototype," Journal of Display Technology, vol. 10, No. 4, Total 10 pages, Institute of Electrical and Electronics Engineers, New York, New York (Apr. 2014).

Wu et al., "Content-Adaptive Focus Configuration for Near-Eye Multi-Focal Displays," 2016 IEEE International Conference on Multimedia and Expo (ICME), Total 6 pages, Institute of Electrical and Electronics Engineers, New York, New York (Jul. 2016).

Narain et al., "Optimal Presentation of Imagery with Focus Cues on Multi-Plane Displays," ACM Transactions on Graphics, vol. 34, No. 4, Article 59, Total 12 pages (Aug. 2015).

"Fast Electrically Tunable Lens, EL-10-30 Series," Total 16 pages, Optotune Switzerland AG (2017).

Shibata et al., "The zone of comfort: Predicting visual discomfort with stereo displays," J Vis., pp. 1-53 (2011).

"How DLP Technology Works," https://training.ti.com/how-dlp-technology-works-0, It is 3 minutes 49 seconds of the video, Texas Instruments Incorporated (Nov. 4, 2014).

"Principles of Time Domain Imaging," Document No. AN0001, Revision: AB, pp. 1-19, Forth Dimension Displays Limited, A subsidiary of Kopin Corporation, (Dec. 19, 2013).

"Digital Light Processing," Wikipedia, Total 9 pages (Apr. 8, 2019).

\* cited by examiner

DEVICE AND METHOD FOR ENHANCING IMAGES

CROSS-REFERENCE TO RELATED APPLICATIONS

This application is a continuation of International Application No. PCT/EP2019/059111, filed on Apr. 10, 2019, the disclosure of which is hereby incorporated by reference in its entirety.

TECHNICAL FIELD

The present disclosure relates to an image processing device and a corresponding method for image processing. The image processing device of the present disclosure can be used for a Multifocal Display (MFD) device related to a Near Eye Display (NED) device, or a Near-To-Eye (NTE) device, or a Head Mounted Display (HMD) device or respective applications. In particular, the present disclosure relates to providing a plurality of enhanced partial images, which together represent an enhanced three-dimensional (3D) image.

BACKGROUND

MFD devices have recently received increasing attention in industry, due to their ability to create a small and portable personal viewing experiment. MFD devices may be applied in the category of Augmented Reality (AR), which typically utilizes a See-Through NED device, and in the category of Virtual Reality (VR), which typically utilizes an Immersive NED device.

An example of a MFD device (here particularly a NED device) is shown in FIG. 1. In order to create the impression of a multifocal 3D display, a viewing distance of a single 2D display from the eye of a user is rapidly switched in synchronization with the rendering of frames of multiple focal planes, in order to create an ideally flicker-free perception.

One key requirement for such a MFD device, particularly to switch the viewing distance of the 2D display, is a high-speed focal modulator element, which may utilize a focus tunable lens, in order to continually adjust/modulate the focal length or optical power of the lens. For instance, an electrically focus-tunable lens or a deformable membrane mirror device (DMMD) may be used as the focus tunable lens.

The MFD device of FIG. 1 further includes an ultrafast display element, which comprises, for instance, a Digital Micromirror Device (DMD) or a Liquid Crystal on Silicon (LCOS), e.g., a Ferroelectric LCOS (FLCOS). Such a display element is used to sequentially display color images at a flicker fusion threshold speed of at least 60 Hz frame rate. Both the display element and the focus tunable lens of the focal modulator element are controlled by a controller of the MFD device.

FIG. 2 shows how different focal planes $I_0$ to $I_3$ are controlled over time (x-axis). The optical power D of the focus tunable lens is plotted in FIG. 2 (y-axis), and may be adjusted by applying a control signal of changing value. For example, a signal of changing current intensity may be applied to change focal planes (e.g., optical power), one current intensity for each optical power of the lens. Accordingly, for generating optical power steps (i.e., jumps between two focal planes), in order to rapidly change between different focal planes, a control signal in the form of a current step is preferably applied. Typically all of the used focal planes are selected once during a frame period of ¹⁄₆₀ s. During each focal plane, an image which corresponds to a certain depth is played.

The area where the eye can see the image of the display is called eye-box. Usually the observer has some freedom to move the HMD in respect to the eye and still see an image (similar to looking in a microscope). If the observer's eyes are centered in the eye-box, the images displayed by each layer Focal plane 1 to 4 appear perfectly stitched to observer. The generated lightfield image reproducing a 3D lightfield comprising the 4 focal planes is shown in FIG. 3.

As the tunable lens changes the focal power of each layer (e.g., focal plane), this adds parallax to the layer (e.g., focal plane). When the eyes of the observer move laterally, the layers (e.g., focal plane) will shift differently—as it happens in the real world (similar to looking on a 3D scene throw a peep-hole) and the viewer observes gaps or black stripes with no visual information between the focal layers, while the size of these gaps corresponds to the distance between the focal planes. The 2-dimensional projections 41 and 42 of a 3D image shown in FIG. 4 exhibit gaps 411 and 421 between the focal layers, when viewed by an observer's eyes, which are not centered in relation to the eye piece, but are oriented laterally to the left or right side of the eye-piece.

SUMMARY

In view of the above-mentioned problems and disadvantages, embodiments of the present disclosure aim to improve MFD devices and their production methods. An object is thereby to provide an image processing device for providing a plurality of enhanced partial images which together represent an enhanced 3D image, particularly with less viewable gaps and stripes. The impact on the viewing experience due to parallax artifacts occurring at the transition between focal planes should be reduced, if not even eliminated.

The object is achieved by the embodiments provided in the enclosed independent claims. Advantageous implementations of the embodiments are further defined in the dependent claims.

In particular embodiments of the present disclosure propose the concealment of the black stripes between the focal planes by means of filtering, crossfading or blurring of multifocal plane images based on an estimated maximum displacement between focal planes.

A first aspect of the present disclosure provides an image processing device for providing a plurality of enhanced partial images which together represent an enhanced three-dimensional, 3D, image, wherein each enhanced partial image is a two-dimensional, 2D, image associated with one of a plurality of focal planes, wherein the image processing device comprises processing circuitry configured to receive or generate a plurality of initial partial images which together form an initial 3D image, wherein each initial partial image is a 2D image associated with one of the plurality of focal planes; and from each of the initial partial images, generate an enhanced partial image by generating a blurred version of the initial partial image; and blending the initial partial image with its blurred version.

The device of the first aspect thus provides a plurality of enhanced partial images which together represent an enhanced 3D image, particularly with less viewable gaps and stripes. The impact on the viewing experience due to parallax artifacts occurring at the transition between focal planes is thus reduced or even eliminated. Accordingly, with the device of the first aspect, an improved MFD device can be provided.

In an implementation form of the first aspect, the generating the enhanced partial image comprises generating a blurred version of the initial partial image and blending the initial partial image with the blurred version so as to reduce perceived artifacts caused by perspective displacement of the initial partial image relative to one or more of the other initial partial images.

In a further implementation form of the first aspect, the generating the blurred version of the initial partial image comprises applying a blurring filter to the initial partial image, wherein a kernel size of the blurring filter is configured so as to reduce perceived artefacts caused by perspective displacement of the initial partial image relative to one or more of the other initial partial images.

The device of this implementation form of the first aspect thus provides a plurality of enhanced partial images which together represent an enhanced 3D image, while the kernel size of the blurring filter may be based on the size of the perspective displacement of the initial partial image relative to one or more of the other initial partial images. The bigger the kernel size the more blurring spread may be applied to each pixel of the initial partial image. As a result, a visual mist is created in the blurred version of the initial partial image extending beyond the edges of the initial partial image.

In an embodiment, the perspective displacement of the initial partial image relative to one or more of the other initial partial images may be an expected upper limit of an apparent displacement.

In a further implementation form of the first aspect, the generating the blurred version of the initial partial image comprises blurring the initial partial image based on a maximum possible perspective displacement, particularly in number of pixels of the partial images.

In a further implementation form of the first aspect, the processing circuitry is configured to estimate the maximum possible perspective displacement based on distances between the focal plane of the initial partial image and the focal planes of the one or more other initial partial images.

The device of this implementation form of the first aspect thus provides a plurality of enhanced partial images which together represent an enhanced 3D image with less viewable gaps and stripes, since a maximum possible perspective displacement between adjacent initial partial images given their distance from each other ensures that gaps and stripes are concealed even at extreme viewing angles.

In a further implementation form of the first aspect, the image processing device is further configured to estimate the maximum possible perspective displacement as $$f \cdot \left( \frac{e}{2z_1} - \frac{e}{2z_2} \right),$$

wherein f is a ratio between a half width of the enhanced partial image in pixels and a tangent of half the field of view, fov, of the eye-box, e denotes a size of the eye-box, $z_1$ denotes a distance between the focal plane of the enhanced partial image and an entrance pupil of the eye-box and $z_2$ denotes a distance between the focal plane of another one of the enhanced partial images and an entrance pupil of an eye-box.

In a further implementation form of the first aspect, the processing circuitry is configured to generate the plurality of initial partial images based on an initial 3D image.

In an embodiment the initial 3D image may be provided in the form of a 2D image and a depth map.

In a further implementation form of the first aspect, the blending the initial partial image with its blurred version comprises filling an empty region of the initial partial image with image content from a corresponding region of the blurred version of the initial partial image.

The region of the initial image is called "empty", if it does not contain any image content (the image content corresponding to the region being associated with one or more other focal planes).

The device of this implementation form of the first aspect thus provides a plurality of enhanced partial images which together represent an enhanced 3D image, wherein a visual mist extends beyond the edges of the original content of the initial partial image, where no image content was present. The visibility of gaps is reduced due to the reduction of contrast along the edges of the original content of the initial partial image.

In a further implementation form of the first aspect, the blending the initial partial image with its blurred version comprises using an image mask which indicates for each pixel of the initial partial image either a first value or a second value; copying the value of a pixel of the blurred version of the initial partial image to a corresponding pixel of the enhanced partial image in response to the image mask indicating the first value for the corresponding pixel, and copying the value of a pixel of the initial partial image to a corresponding pixel of the enhanced partial image in response to the image mask indicating the second value for that pixel.

The device of this implementation form of the first aspect thus provides a plurality of enhanced partial images which together represent an enhanced 3D image, wherein the enhanced partial images only exhibit a visual mist beyond the edges of the original content of the initial partial image (e.g., empty region), while the original content of the initial partial images in the non-empty region is not affected by the blurring process.

In a further implementation form of the first aspect, any empty region in the initial partial image is associated with the first value and any non-empty region in the initial partial image is associated with the second value.

A second aspect of the present disclosure provides a multifocal display, MFD, apparatus, comprising an image processing device according to any one of the preceding claims; and optics for enabling a viewer to see each of the enhanced partial images at its associated focal plane.

A third aspect of the present disclosure provides an image processing method for providing a plurality of enhanced partial images which together represent an enhanced three-dimensional, 3D, image, wherein each enhanced partial image is a two-dimensional, 2D, image associated with one of a plurality of focal planes, the method comprising receiving or generating a plurality of initial partial images, which together form an initial 3D image, wherein each initial partial image is a 2D image associated with one of the plurality of focal planes; and generating an enhanced partial image from each of the initial partial images by generating a blurred version of the initial partial image and blending the initial partial image with its blurred version.

A fourth aspect of the present disclosure provides a non-transitory storage medium comprising a program code which causes a computer to perform the method according to the third aspect, when the program is executed by the computer.

The processing circuitry may comprise hardware and software. The hardware may comprise analog circuitry or digital circuitry, or both analog and digital circuitry. Digital circuitry may comprise components such as application-specific integrated circuits (ASICs), field-programmable arrays (FPGAs), digital signal processors (DSPs), or general-purpose processors. In one embodiment, the processing circuitry comprises one or more processors and a non-volatile memory connected to the one or more processors. The non-volatile memory may carry executable program code which, when executed by the one or more processors, causes the apparatus to perform the operations or methods described herein.

The filters mentioned herein may be implemented in hardware or in software or in a combination of hardware and software.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

To make the objectives, technical solutions, and advantages of the embodiments of the present disclosure clearer, the following further describes embodiments of the present disclosure in detail with reference to the accompanying drawings. Apparently, the described embodiments are some but not all of the embodiments of the present disclosure.

Figure 5:
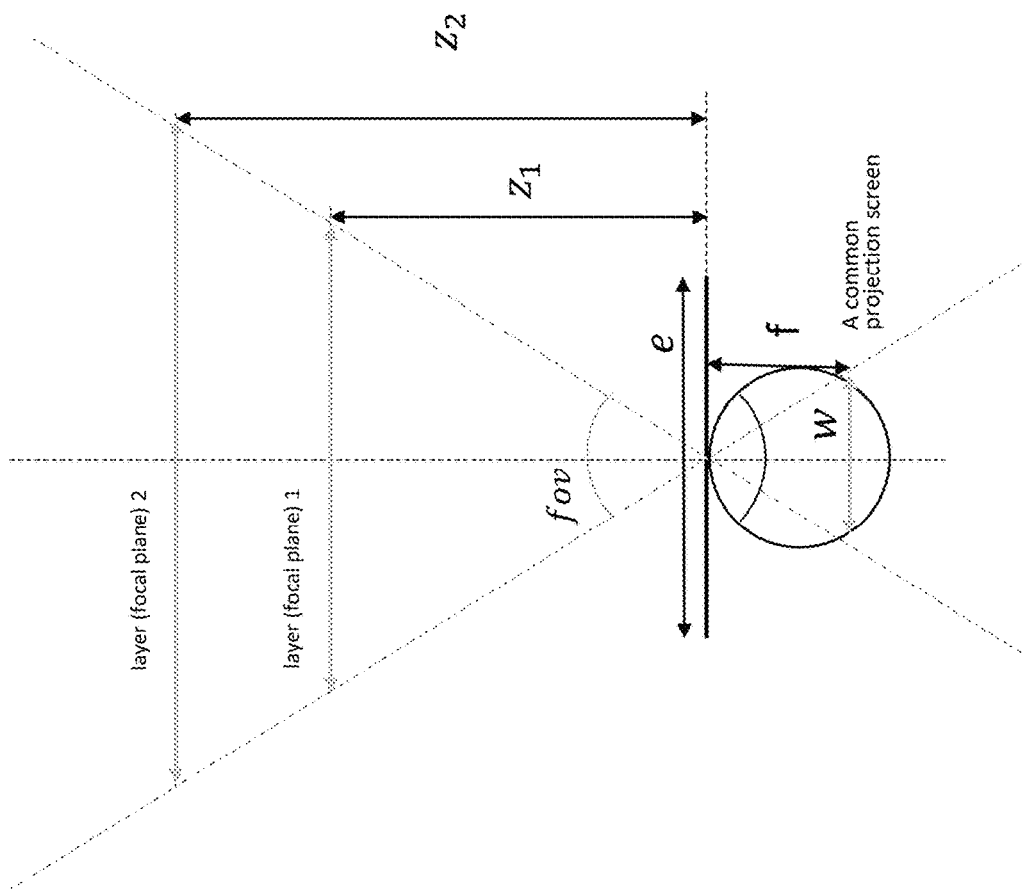
FIG. 5 depicts an optical model of an MFD together with a viewing entity consisting of two focal planes according to an embodiment of the present disclosure.

FIG. 5 shows an optical model consisting of two focal plane images according to an embodiment of the present disclosure, which describes the projection of separate focal planes in an e.g. MFD onto a common projection screen. The figure also denotes the notations being used throughout the document, as follows:
 e—eyebox size [mm]
 fov—field of view of the system [radian]
 w—number of pixels along a diameter visible through the optical system for a given fov [pixels]
 $z_1$—distance between layer (e.g., focal plane) 1 and entrance pupil of the system [mm]
 $z_2$—distance between layer (e.g., focal plane) 2 and entrance pupil of the system [mm]
 f—ratio between half width of the sensor and tangent of half fov [pixels], wherein $$f = \frac{w/2}{\tan\left(\frac{fov}{2}\right)};$$

The common projection screen, identified as such in FIG. 5 is a screen, onto which all focal planes, e.g., layer 1 and layer 2 and also any perspective displacement between them are projected. In a viewing scenario by an observer, the common projection screen may be the retina of the observer's eyes.

Figure 6:
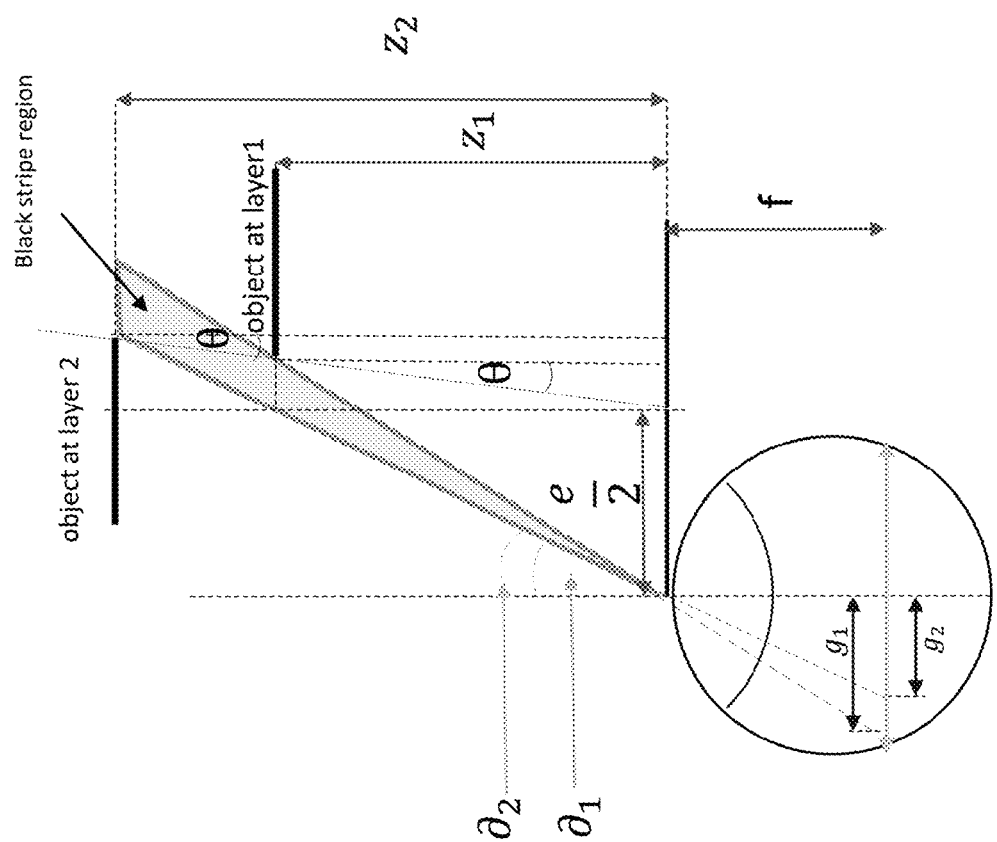
FIG. 6 depicts the calculation of a maximum possible perspective displacement of two focal planes as visible to an observer according to an embodiment of the present disclosure.

FIG. 6 describes the estimation or calculation of a maximum possible perspective displacement g between two focal planes as an eye of an observer is shifted to the far left of the center of the eye-box with the size e. The figure also depicts a black stripe region as a solid angle spanned by the oblique viewing of focal layers 1 and 2. The projection of the black stripe region onto the common projection screen produces the value g, which is defined as:
 g—the maximum possible size of the black stripes between the images displayed by different layers (focal planes) [pixels]

The following trigonometric formulae (1) to (7) describe the geometric attributes of the black stripe region and lead to formula (7) of g depending on f, e, $z_1$ and $z_2$.

$$\tan\partial_1 = \frac{g_1}{f}; \tag{1}$$

$$g_1 = f \cdot \left(\frac{e}{2z_1} + \tan\theta\right); \tag{2}$$

$$\tan\partial_1 = \frac{\frac{e}{2} + z_1\tan\theta}{z_1}; \tag{3}$$

$$\tan\partial_2 = \frac{g_2}{f}; \tag{4}$$

$$g_2 = f \cdot \left(\frac{e}{2z_2} + \tan\theta\right); \tag{5}$$

$$\tan\partial_2 = \frac{\frac{e}{2} + z_2\tan\theta}{z_2}; \tag{6}$$

$$g = g_1 - g_2 = f \cdot \left(\frac{e}{2z_1} - \frac{e}{2z_2}\right) = \frac{w/2}{\tan\left(\frac{fov}{2}\right)} \cdot \left(\frac{e}{2z_1} - \frac{e}{2z_2}\right); \tag{7}$$

Figure 1:
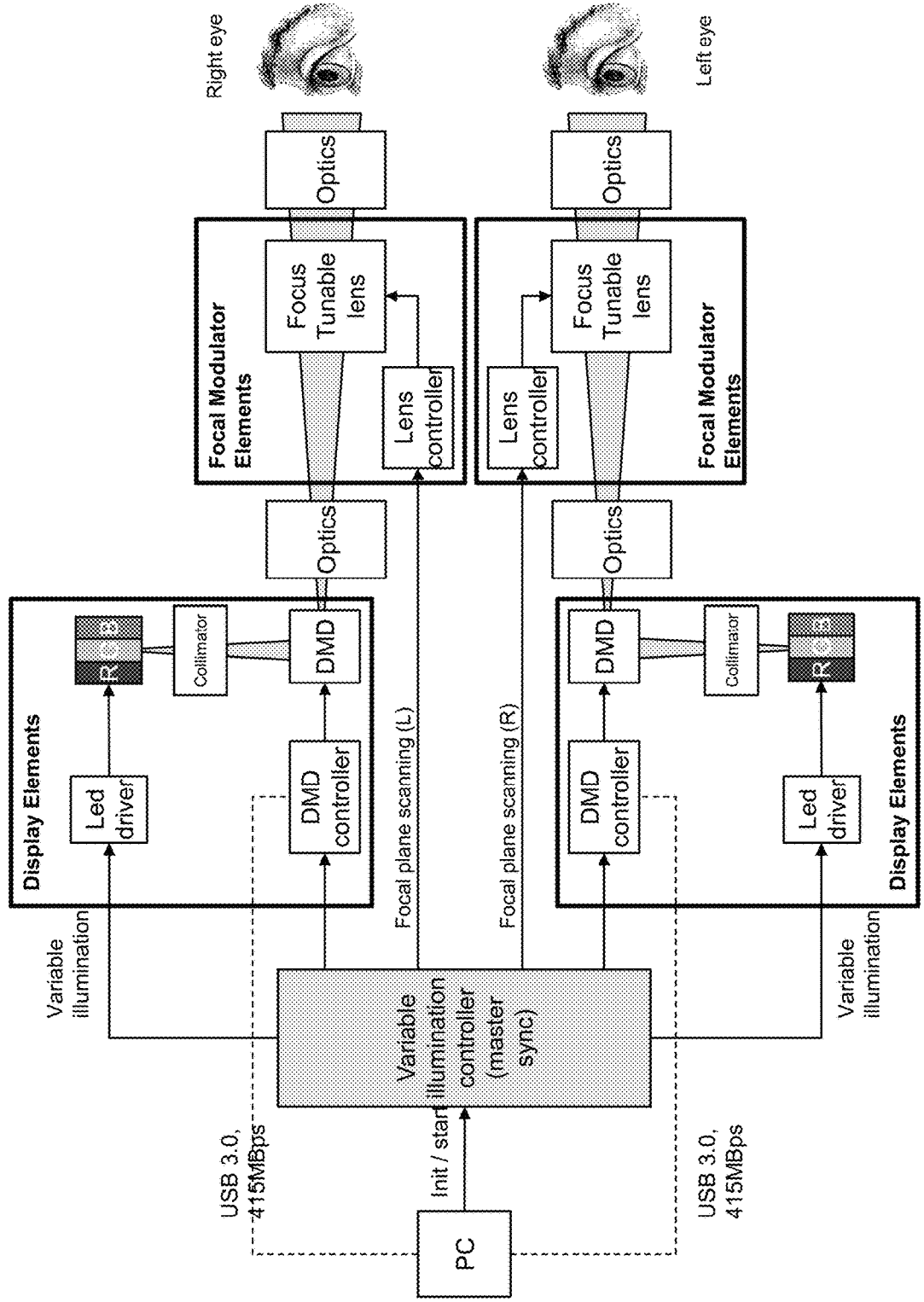
FIG. 1 shows an exemplary MFD device.
Figure 2:
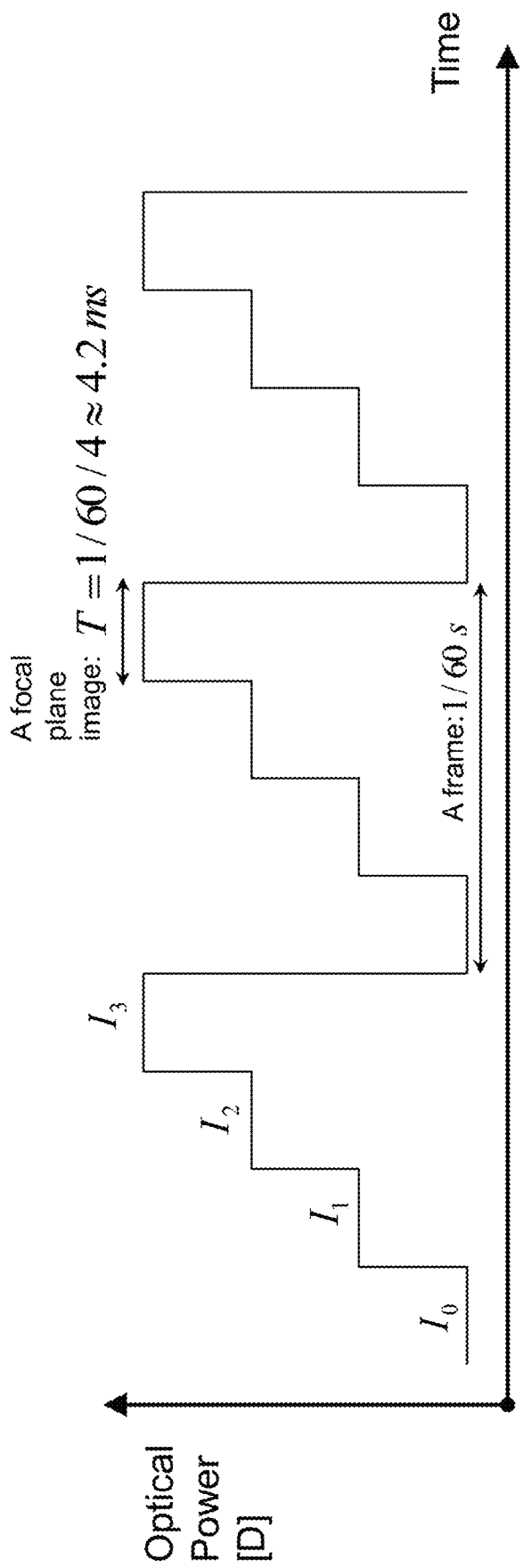
FIG. 2 shows schematically an optical power of a focus tunable lens over time for four focal planes of different index.
Figure 3:
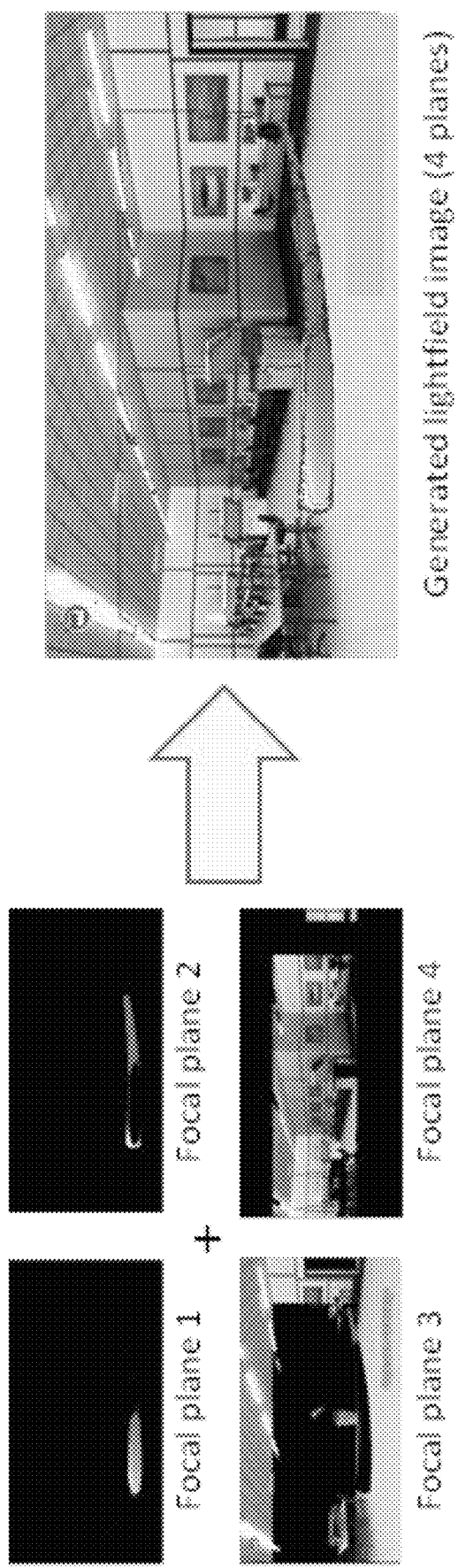
FIG. 3 shows the visual composition of a 3D image by using partial images displayed on separate focal planes.
Figure 4:
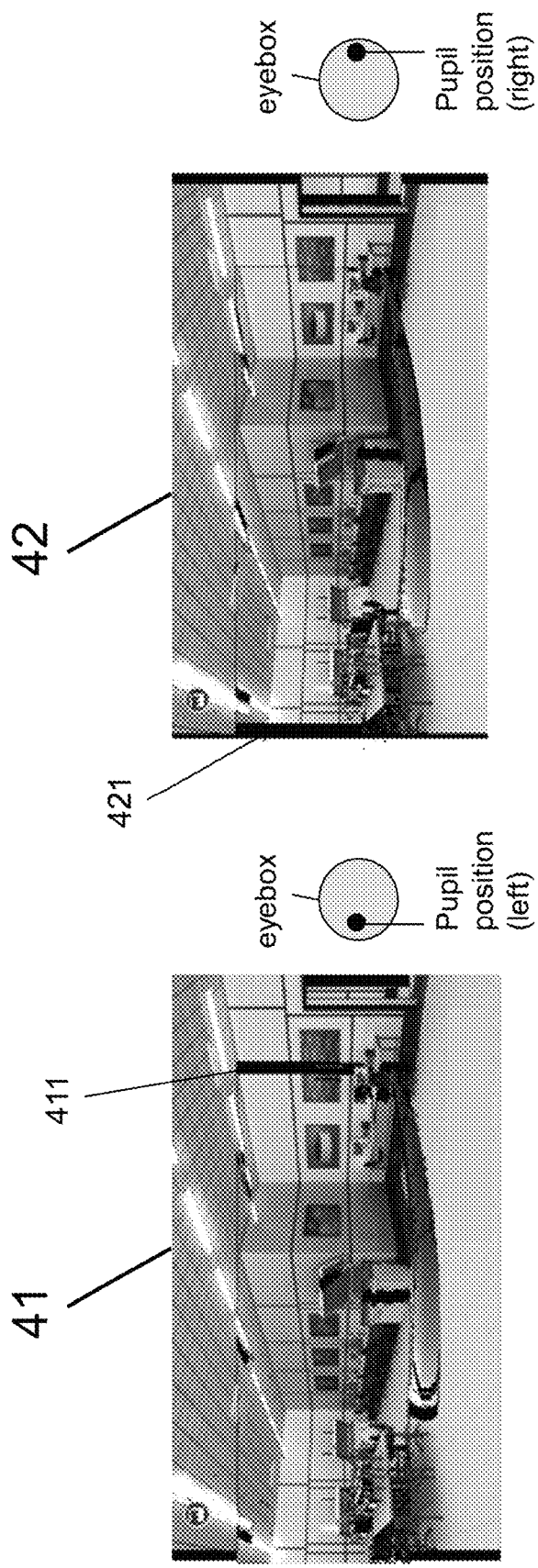
FIG. 4 depicts a problem of prior art, when an observer's eyes view the 3D image from an angle.

In an embodiment of the present disclosure, an image processing device is configured to estimate the maximum possible perspective displacement g based on distances between the focal plane of an initial partial image and the focal planes of one or more other enhanced partial images. Based on this information, images of each layer are then manipulated to minimize the size or conceal the visibility of perceived black stripes by the user, which develop along the seams, where the image of one focal layer merges with the image of another focal layer. Each image may comprise multiple seams where it merges with respective images of different focal layers, as is visible in FIG. 3. The partial image of Focal plane 4 depicted therein exhibits seams to the other partial images of Focal plane 1, Focal plane 2 and Focal plane 3.

In an embodiment of the present disclosure, the manipulation of the layers is performed by generating a blurred version of the initial partial image and blending the initial partial image with the blurred version so as to reduce perceived artefacts caused by perspective displacement of the initial partial image relative to one or more of the other initial partial images. In a further embodiment of the present disclosure the blurring may be performed by filtering or crossfading the initial partial images.

Figure 7:
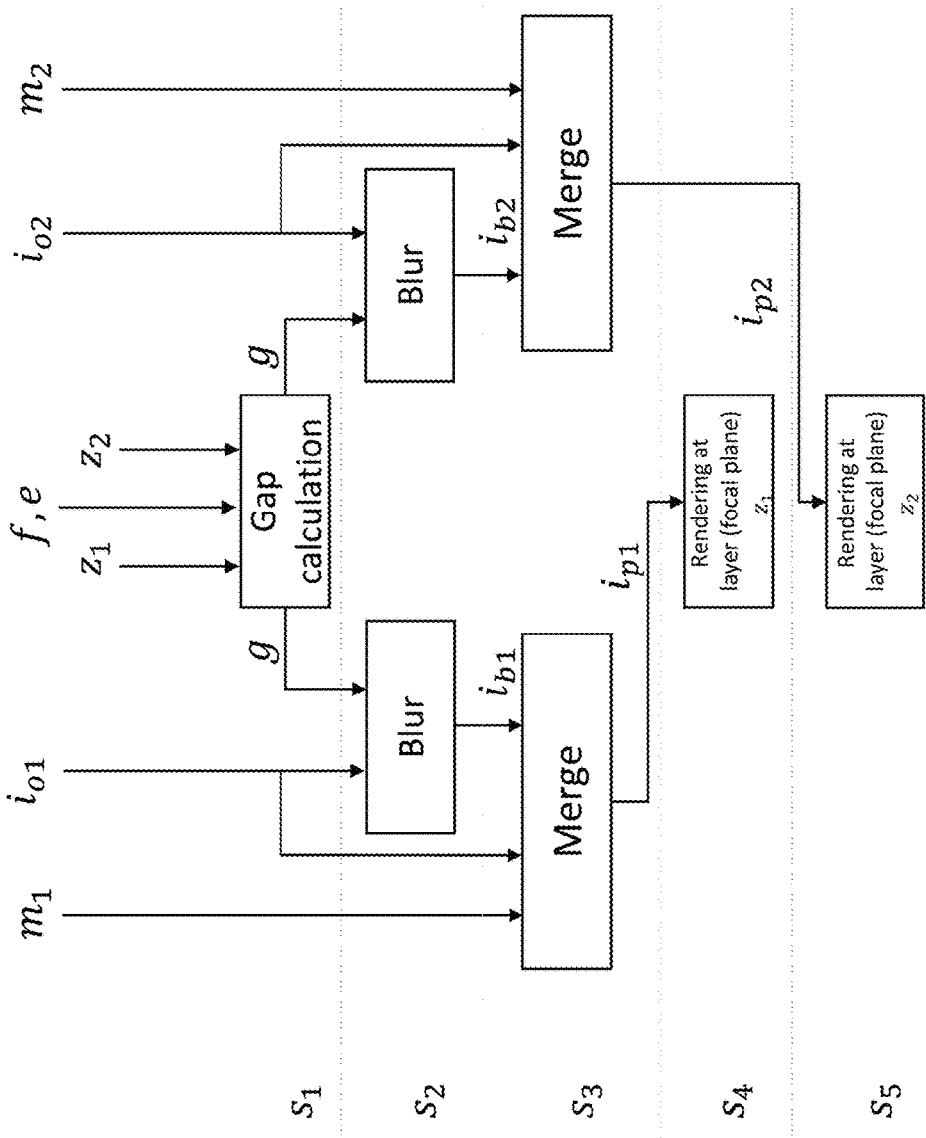
FIG. 7 depicts a flowchart of a blurring process to conceal perspective artefacts according to an embodiment of the present disclosure.

FIG. 7 depicts a flowchart of the proposed blurring process according to an embodiment of the present disclosure with the following notations:

$i_{o1}$—the original image (unprocessed) corresponding to the layer (focal plane) 1
$i_{o2}$—the original image (unprocessed) corresponding to the layer (focal plane) 2
$m_1$—the pixel mask for the layer (focal plane) 1
$m_2$—the pixel mask for the layer (focal plane) 2
$i_{b1}$—the blurred version of image corresponding to the layer (focal plane) 1
$i_{b2}$—the blurred version of image corresponding to the layer (focal plane) 2
$i_{p1}$—the merged image corresponding to the layer (focal plane) 1
$i_{p2}$—the merged image corresponding to the layer (focal plane) 2

The first step $s_1$ performs the calculation of the maximum possible perspective displacement as described in FIG. 6. The second step $s_2$ then generates the blurred version $i_{b1}$ and $i_{b2}$ from the original or initial partial images $i_{o1}$ and $i_{o2}$ respectively, given the maximum possible perspective displacement g.

In an embodiment of the present disclosure, the blurred versions $i_{b1}$ and $i_{b2}$ of the respective initial partial images may be attained by applying a blurring filter to the initial partial images, wherein a kernel size of the blurring filter may be configured so as to reduce perceived artefacts caused by perspective displacement of the initial partial image relative to one or more of the other initial partial images. Due to the blurring a visual mist develops beyond the borders or seams of each initial partial image, whose extension and intensity is corresponding to the size and internal dynamic of the kernel. Said mist is used to conceal the black stripes between adjacent partial images.

Since a disposition of said mist is only needed in areas where the black stripes between adjacent partial images arise, the effects of the blurring may be reverted on each pixel of the initial partial image by a subsequent merging or blending process. The merging process of the original and respective blurred version is done in the third step $s_3$ to output the processed images $i_{p1}$ and $i_{p2}$.

According to the present embodiment, the merging may take into account image masks $m_1$ and $m_2$ for each initial partial image $i_{o1}$ and $i_{o2}$, where each mask may contain the pixel values 0 and 1 or any other two distinct values. Accordingly, the image mask is a binary image. The value 0 indicates that the corresponding pixel value, usually the RGB intensity value of a given pixel of the respective initial partial image $i_{o1}$ or $i_{o2}$, does not belong to the original focal plane image content, but to a black or "empty" area of the initial partial image surrounding the focal plane image content intended to be projected (e.g., see the black areas of focal planes 1 to 4 depicted on the left side of FIG. 3, which do not contain any image content) and therefore the corresponding pixel value of the blurred image is copied to the processed image. The pixel value 1 indicates that the corresponding pixel value of the respective initial partial image $i_{o1}$ or $i_{o2}$ belongs to the focal plane image content and therefore the pixel value of the original image is copied to the processed image. The remaining steps $s_4$ and $s_5$ display the processed images sequentially, which are rendered on their respective layer (e.g., focal plane). As a result processed or enhanced partial images are rendered, which exhibit a mist only along their common border or seam.

Figure 8:
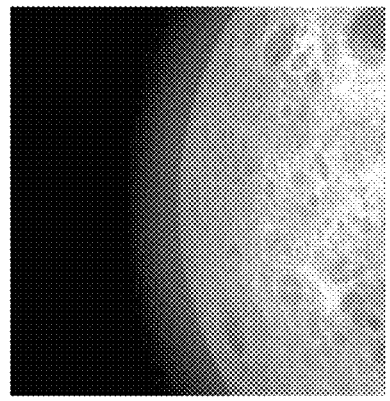
FIG. 8 shows enhanced images $i_{p1}$ and $i_{p2}$ according to an embodiment of the present disclosure.
Figure 8:
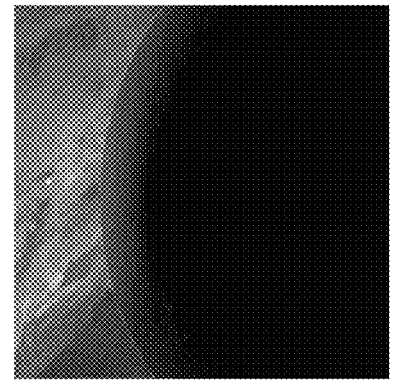
Figure 8:
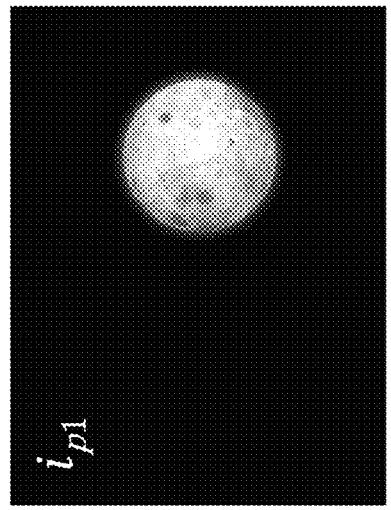
Figure 8:
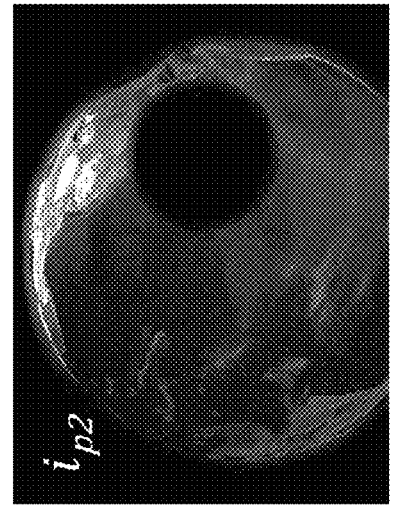
Figure 8:
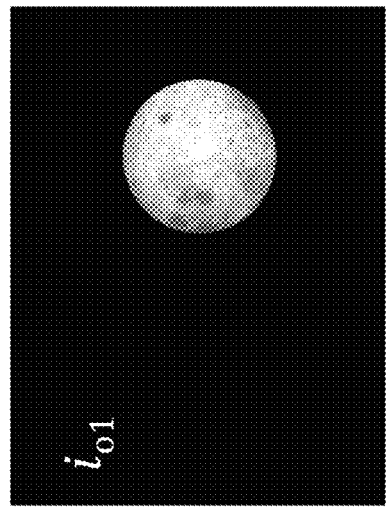
Figure 8:
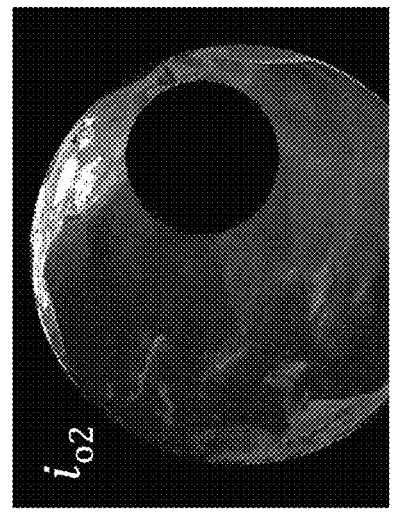

FIG. 8 shows an example of the resulting processed or enhanced partial images $i_{p1}$ and $i_{p2}$. Scene a) depicts the original (unprocessed) partial images $i_{o1}$ ("moon") and $i_{o2}$ ("earth") corresponding to the layer (e.g., focal plane) 1 and 2, wherein the partial images $i_{o1}$ and $i_{o2}$ complement each other to form a complete 3D image of a moon captured in its orbit in front of the earth. Scene b) depicts the merged images $i_{p1}$ and $i_{p2}$ after processing (i.e., blurring and masking) corresponding to the layer (e.g., focal plane) 1 and 2 as described in FIG. 7. Scene c) depicts close up details of the processed images $i_{p1}$ and $i_{p2}$. The original object on the image remains sharp (i.e., unprocessed), while an additional crossfade data appears (e.g., "mist" on the edge) along its borders to the empty space, which before processing did not contain any data at all.

Figure 9:
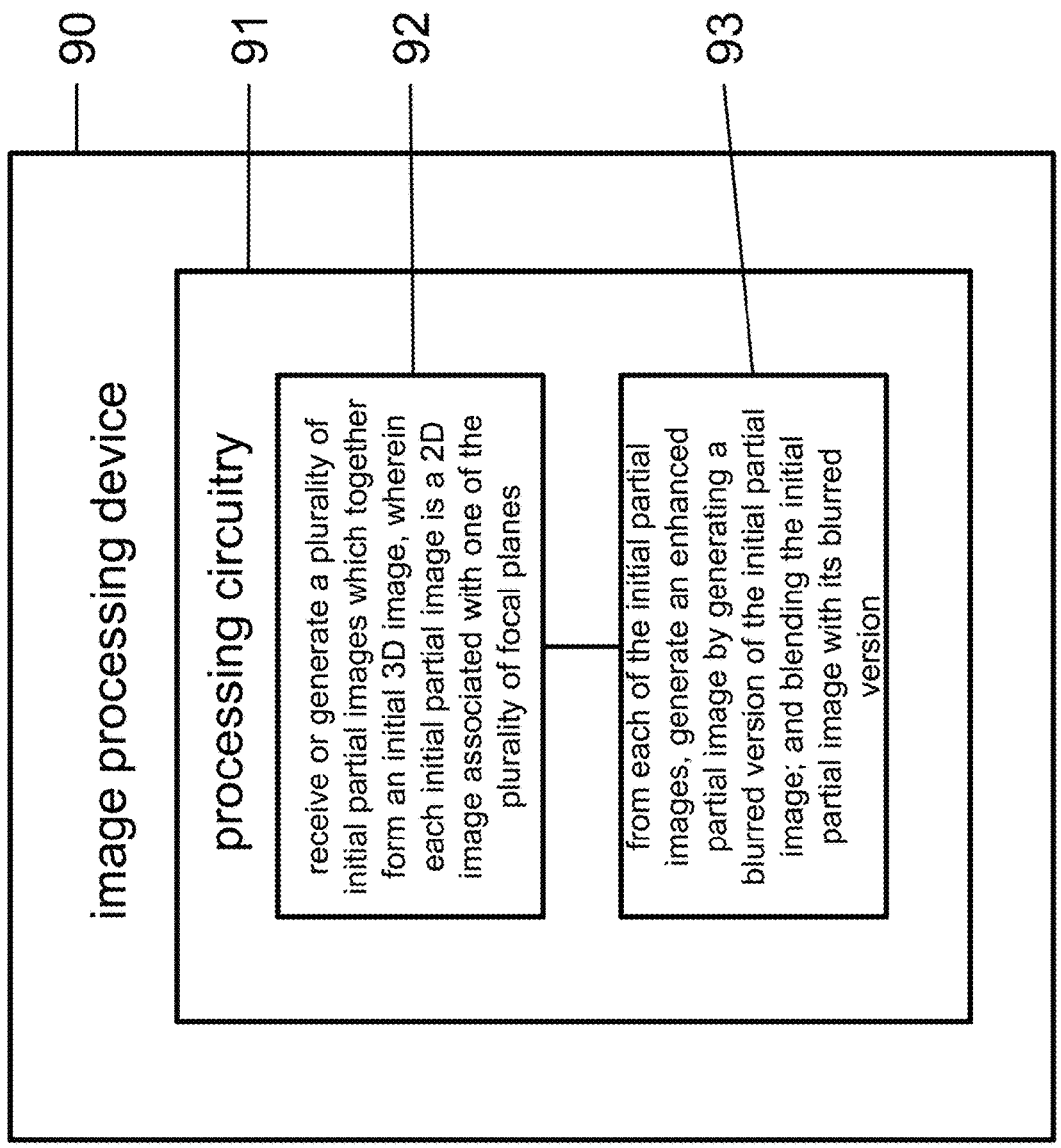
FIG. 9 shows an image processing device according to an embodiment of the present disclosure.

FIG. 9 shows an image processing device 90 for providing a plurality of enhanced partial images which together represent an enhanced three-dimensional, 3D, image, wherein each enhanced partial image is a two-dimensional, 2D, image associated with one of a plurality of focal planes, wherein the image processing device comprises processing circuitry 91 configured to receive or generate 92 a plurality of initial partial images which together form an initial 3D image, wherein each initial partial image is a 2D image associated with one of the plurality of focal planes; and generate 93, from each of the initial partial images, an enhanced partial image by generating a blurred version of the initial partial image; and blending the initial partial image with its blurred version.

Figure 10:
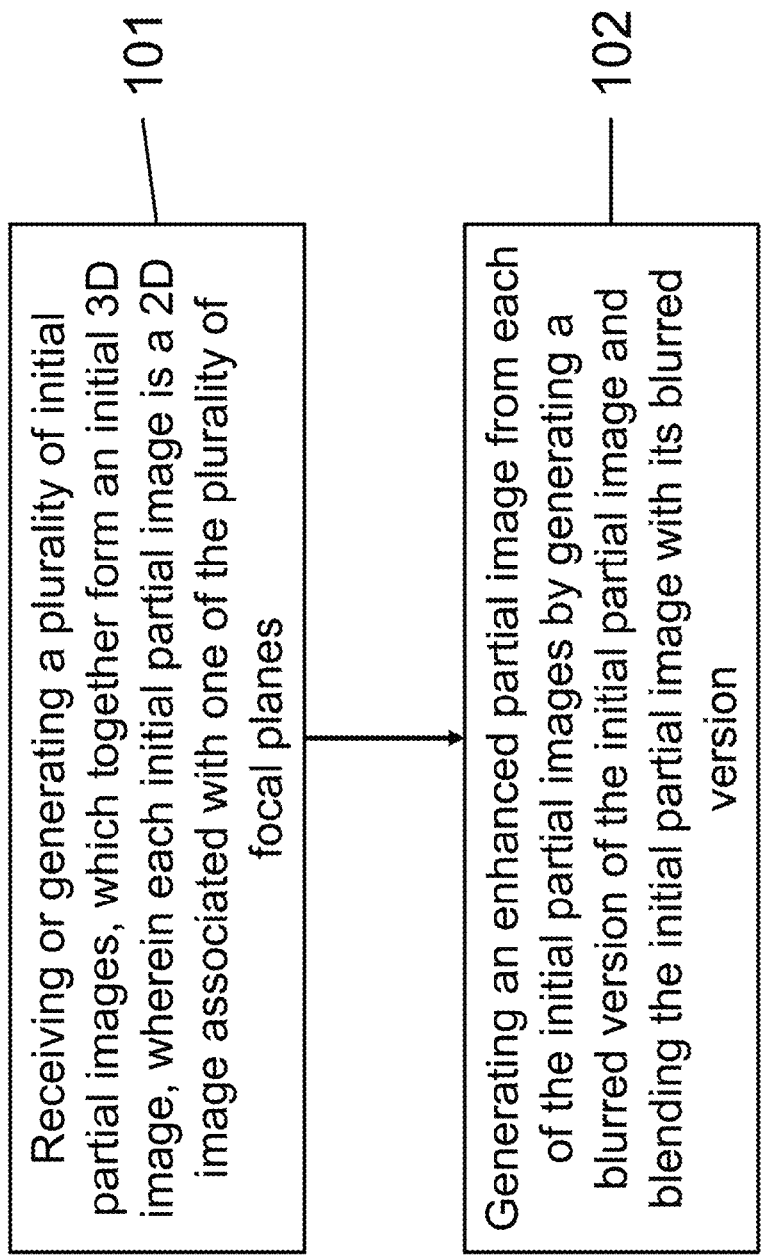
FIG. 10 shows an image processing method according to an embodiment of the present disclosure.

FIG. 10 shows an image processing method for providing a plurality of enhanced partial images which together represent an enhanced 3D image, wherein each enhanced partial image is a two-dimensional, 2D, image associated with one of a plurality of focal planes, the method comprising the steps of receiving or generating 101, by a processing circuitry, a plurality of initial partial images, which together form an initial 3D image, wherein each initial partial image is a 2D image associated with one of the plurality of focal planes; and generating 102, by the processing circuitry, an enhanced partial image from each of the initial partial images by generating a blurred version of the initial partial image and blending the initial partial image with its blurred version.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. An image processing device for providing a plurality of enhanced partial images, which together represent an enhanced three-dimensional (3D) image, wherein each enhanced partial image is a two-dimensional (2D) image associated with one of a plurality of focal planes, the image processing device comprising processing circuitry configured to:
receive or generate a plurality of initial partial images, which together form an initial 3D image, wherein each initial partial image is a 2D image associated with one of the plurality of focal planes; and
from each of the initial partial images, generate an enhanced partial image by:
generating a blurred version of the initial partial image, wherein the generating the blurred version of the initial partial image comprises blurring the initial partial image based on a maximum possible perspective displacement; and
blending the initial partial image with the blurred version of the initial partial image.

2. The image processing device according to claim 1, wherein the generating the enhanced partial image comprises:
generating the blurred version of the initial partial image and blending the initial partial image with the blurred version of the initial partial image to reduce perceived artifacts caused by a perspective displacement of the initial partial image relative to one or more of the other initial partial images.

3. The image processing device according to claim 2, wherein the generating the blurred version of the initial partial image comprises:
applying a blurring filter to the initial partial image, wherein a kernel size of the blurring filter is configured to reduce perceived artifacts caused by the perspective displacement of the initial partial image relative to the one or more of the other initial partial images.

4. The image processing device according to claim 1, wherein the processing circuitry is configured to:
estimate the maximum possible perspective displacement based on distances between the focal plane of the initial partial image and the focal planes of the one or more other initial partial images.

5. The image processing device according to claim 1, wherein the processing circuitry is configured to:
estimate the maximum possible perspective displacement as $$f \cdot \left(\frac{e}{2z_1} - \frac{e}{2z_2}\right),$$

wherein f is a ratio between a half width of the initial partial image in pixels and a tangent of half the field of view (fov) of an eye-box, e denotes a size of the eye-box, $z_1$ denotes a distance between the focal plane of the enhanced partial image and an entrance pupil of the eye-box and $z_2$ denotes a distance between the focal plane of another one of the initial partial images and an entrance pupil of an eye-box.

6. The image processing device according to claim 1, wherein the processing circuitry is configured to generate the plurality of initial partial images based on a 3D image.

7. The image processing device according to claim 1, wherein the blending the initial partial image with its blurred version comprises:
filling an empty region of the initial partial image with image content from a corresponding region of the blurred version of the initial partial image.

8. The image processing device according to claim 1, wherein blending the initial partial image with the blurred version of the initial partial image comprises:
using an image mask, which indicates for each pixel of the initial partial image either a first value or a second value;
copying the value of a pixel of the blurred version of the initial partial image to a corresponding pixel of the enhanced partial image in response to the image mask indicating the first value for the corresponding pixel, or
copying the value of a pixel of the initial partial image to the corresponding pixel of the enhanced partial image in response to the image mask indicating the second value for the corresponding pixel.

9. The image processing device according to claim 8, wherein empty regions in the initial partial image are associated with the first value and non-empty regions in the initial partial image are associated with the second value.

10. A multifocal display, MFD, apparatus, comprising:
an image processing device according to claim 1; and
optics for enabling a viewer to see each of the enhanced partial images at a corresponding focal plane.

11. An image processing method for providing a plurality of enhanced partial images, which together represent an enhanced three-dimensional (3D) image, wherein each enhanced partial image is a two-dimensional (2D) image associated with one of a plurality of focal planes, the method comprising:
receiving or generating, by a processing circuitry, a plurality of initial partial images, which together form an initial 3D image, wherein each initial partial image is a 2D image associated with one of the plurality of focal planes; and
generating, by the processing circuitry, an enhanced partial image from each of the initial partial images by generating a blurred version of the initial partial image and blending the initial partial image with the blurred version of the initial partial image, wherein the generating the blurred version of the initial partial image comprises blurring the initial partial image based on a maximum possible perspective displacement.

12. A non-transitory storage medium comprising a program code which causes a computer to perform the method according to claim 11 when the program code is executed by the computer.

13. The method according to claim 11, wherein the generating the enhanced partial image comprises:
generating the blurred version of the initial partial image and blending the initial partial image with the blurred version of the initial partial image to reduce perceived artifacts caused by a perspective displacement of the initial partial image relative to one or more of the other initial partial images.

14. The method according to claim 13, wherein the generating the blurred version of the initial partial image comprises:
applying a blurring filter to the initial partial image, wherein a kernel size of the blurring filter is configured to reduce perceived artifacts caused by the perspective displacement of the initial partial image relative to the one or more of the other initial partial images.

15. The method according to claim 11, wherein the processing circuitry is configured to:
estimate the maximum possible perspective displacement based on distances between the focal plane of the initial partial image and the focal planes of the one or more other initial partial images.

16. The method according to claim 11, wherein the processing circuitry is configured to:
estimate the maximum possible perspective displacement as $$f \cdot \left( \frac{e}{2z_1} - \frac{e}{2z_2} \right),$$

wherein f is a ratio between a half width of the initial partial image in pixels and a tangent of half the field of view (fov) of an eye-box, e denotes a size of the eye-box, $z_1$ denotes a distance between the focal plane of the enhanced partial image and an entrance pupil of the eye-box and $z_2$ denotes a distance between the focal plane of another one of the initial partial images and an entrance pupil of an eye-box.

17. The method according to claim 11, wherein the blending the initial partial image with the blurred version of the initial partial image comprises:
filling an empty region of the initial partial image with image content from a corresponding region of the blurred version of the initial partial image.

18. The method according to claim 11, wherein the blending the initial partial image with the blurred version of the initial partial image comprises:
using an image mask, which indicates for each pixel of the initial partial image either a first value or a second value;
copying the value of a pixel of the blurred version of the initial partial image to a corresponding pixel of the enhanced partial image in response to the image mask indicating the first value for the corresponding pixel, or
copying the value of a pixel of the initial partial image to the corresponding pixel of the enhanced partial image in response to the image mask indicating the second value for the corresponding pixel.

* * * * *